United States Patent [19]

Sengoku

[11] 4,412,406
[45] Nov. 1, 1983

[54] METHOD OF AND A DEVICE FOR FIXING A WINDOW MOLDING ONTO A WINDOWPANE

[75] Inventor: Ikuo Sengoku, Toyota, Japan

[73] Assignee: Toyota Jidosha Kogyo Kabushiki Kaisha, Toyota, Japan

[21] Appl. No.: 250,678

[22] Filed: Apr. 3, 1981

[30] Foreign Application Priority Data

Nov. 5, 1980 [JP] Japan .................. 55-154572

[51] Int. Cl.³ .............................................. E06B 3/00
[52] U.S. Cl. ...................................... 52/208; 52/397; 52/718; 52/741
[58] Field of Search ................. 52/208, 716, 717, 401, 52/397, 309.16, 741, 718; 296/84 R, 84 A

[56] References Cited

U.S. PATENT DOCUMENTS

| | | | |
|---|---|---|---|
| 3,760,544 | 9/1973 | Hawes et al. | 52/309.16 X |
| 3,851,433 | 12/1974 | Colucci | 52/717 X |
| 4,147,005 | 4/1979 | Meyer | 52/717 X |
| 4,170,855 | 10/1979 | Murray et al. | 52/717 X |

Primary Examiner—Carl D. Friedman
Attorney, Agent, or Firm—Parkhurst & Oliff

[57] ABSTRACT

A windowpane assembly comprising a molding clip which is stuck onto the riser portion of the fillister formed on a vehicle body for fixing a window molding onto the windowpane. The molding clip comprises a holding portion holding the window molding, a pair of elastic wings, and a pair of latch claws. Before the window molding is inserted between the windowpane and the riser portion of the fillister, the elastic wings are engaged with the corresponding latch claws and, then, the molding clip is stuck onto the riser portion. When the window molding is inserted between the windowpane and the riser portion of the fillister, the elastic wings are automatically disengaged from the latch claws and come into engagement with the circumferential end face of the windowpane.

26 Claims, 23 Drawing Figures

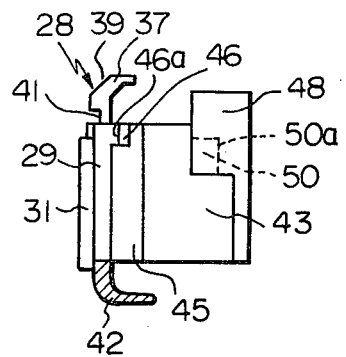
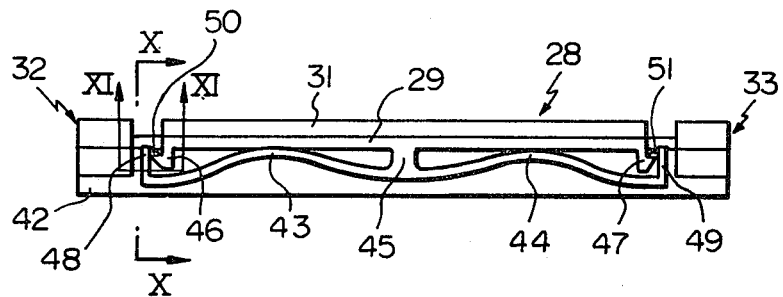
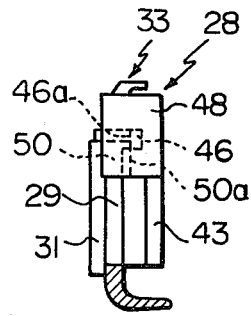

METHOD OF AND A DEVICE FOR FIXING A WINDOW MOLDING ONTO A WINDOWPANE

DESCRIPTION OF THE INVENTION

The present invention relates to a method of and a device for fixing a windowpane, such as a windshield or a rear window of a vehicle, onto the body of a vehicle.

As illustrated in FIG. 1, in, for example, a windshield of a motor vehicle, the periphery of the windshield 1 is covered by a decorative window molding 2, and a plurality of window molding fixing devices 3 is attached onto the rear of the window molding 2. FIGS. 2 through 5 illustrate such a conventional window molding fixing device 3. Referring to FIGS. 2 through 5, the body panel 4 of a vehicle has a fillister 5 formed thereon for receiving the windshield 1, and the periphery of the windshield 1 is stuck onto the bottom wall 6 of the fillister 5 by means of an adhesive packing material 7. As illustrated in FIGS. 2 through 5, the conventional window molding fixing device 3 comprises a retainer 9 stuck onto the riser portion 8 of the fillister 5, and a molding clip 10. As illustrated in FIG. 3, the molding clip 10 comprises a base portion 11 and an elastic arm portion 12. In addition, a deformable elastic portion 13 is formed on the central portion of the base portion 11, and a latch claw 14 is formed in one piece on the elastic portion 13. On the other hand, as illustrated in FIGS. 2, 4 and 5, the rear face of the retainer 9 is stuck onto the riser portion 8 of the fillister 5 by means of a two-face adhesive tape 15, and a hook 16 is formed in one piece on the front face of the retainer 9. The molding clip 10 is secured onto the window molding 2 in such a way that the tip of the elastic arm portion 12 of the molding clip 10 is engaged with the inner peripheral portion 2a of the window molding 2, and the outer peripheral portion 2b of the window molding 2 is engaged with the groove 17 formed on the rear face of the base portion 11 of the molding clip 10. In addition, the molding clip 10 is fixed onto the windshield 1 in such a way that the latch claw 14 of the elastic portion 13 of the molding clip 10 is engaged with the hook 16 of the retainer 9 as illustrated in FIG. 5. However, in this conventional window molding fixing device 3, when the window molding 2 is fixed onto the windshield 1 as illustrated in FIG. 5, the elastic arm portion 12 of the molding clip 10 is in an elastically deformed state wherein it is bent in a direction illustrated by the arrow A in FIG. 4 so that the inner peripheral portion 2a of the window molding 2 is pressed onto the front face of the windshield 1 due to the elastic force of the elastic arm portion 12 of the molding clip 10. Consequently, at this time, the force, illustrated by the arrow B in FIG. 4, acts on the base portion 11 of the molding clip 10 and, as a result, a problem occurs in that the retainer 9 will become detached from the riser portion 8 of the fillister 5 due to the force illustrated by the arrow B in FIG. 4. In addition, since the conventional window molding fixing device 3 is constructed of two-parts, that is, the retainer 9 and the molding clip 10, another problem occurs in that the manufacturing cost of the window molding fixing device will be increased.

An object of the present invention is to provide a window molding fixing method capable of preventing a window molding fixing device from being detached from the fillister and also provide a window molding fixing device which can be constructed of a single part and is capable of preventing the window molding fixing device from being detached from the fillister.

According to the present invention, there is provided a method of fixing a window molding onto a windowpane arranged in an L-shaped cross-sectional fillister of a vehicle body, which extends along an outer periphery of the windowpane and comprises a riser portion extending inwardly from the vehicle body, and a bottom portion extending substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section and an outer periphery, said method comprising using a molding clip which comprises a holding portion engageable with the outer periphery of the window molding, an elastic wing member intended to resiliently abut against the outer periphery of the windowpane within the gap, and a claw member engageable with said elastic wing member for maintaining said elastic wing member in a compressed state to accumulate the elastic force of said elastic wing member, said method being carried out by the following steps of: engaging said elastic wing member with said claw member to maintain said elastic wing member in the compressed state; sticking said molding clip onto the riser portion of said fillister; pushing said window molding to insert the outer periphery of said window molding between said holding portion and the riser portion of said fillister; automatically disengaging said elastic wing member from said claw member due to the pushing operation and causing said elastic wing member to resiliently abut against the outer periphery of said windowpane, and; engaging the outer periphery of said window molding with said holding portion to hold said window molding.

In addition, according to the present invention, there is provided a windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section and an outer periphery, said device having a molding clip fixed onto the riser portion of said fillister and inserted into the gap for fixing the window molding onto the windowpane, said molding clip comprising: a holding portion engageable with the outer periphery of said window molding to hold said window molding; an elastic wing member intended to resiliently abut against the outer periphery of the windowpane within the gap; latch means engageable with said elastic wing member for maintaining said elastic wing member in a compressed state to accumulate the elastic force of said elastic wing member, and; disengaging means for disengaging said elastic wing member from said latch means and causing said elastic wing member to resiliently abut against the outer periphery of said windowpane.

The present invention may be more fully understood from the description of preferred embodiments of the invention set forth below, together with the accompanying drawings.

BRIEF DESCRIPTION OF THE DRAWINGS

In the drawings:

FIG. 8 is a cross-sectional side view taken along the line VIII—VIII in FIG. 7;

FIG. 9 is a plan view of a molding clip in which the elastic wings are engaged with the latch claws of the base portion;

FIG. 10 is a cross-sectional view taken along the line X—X in FIG. 9;

DESCRIPTION OF PREFERRED EMBODIMENTS

Figure 1:
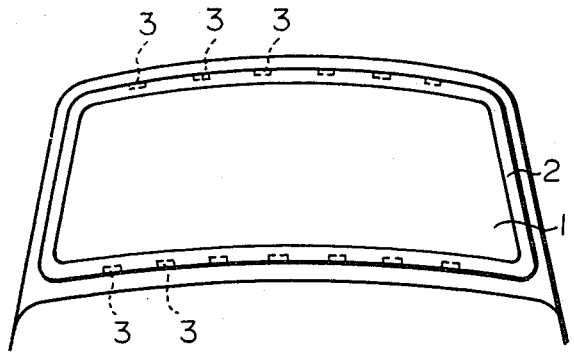
FIG. 1 is a front view of a windshield of a vehicle.
Figure 2:
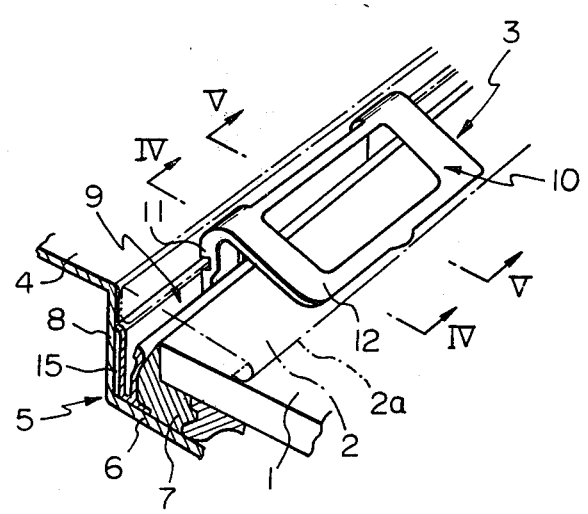
FIG. 2 is a perspective view of a conventional window molding fixing device.
Figure 3:
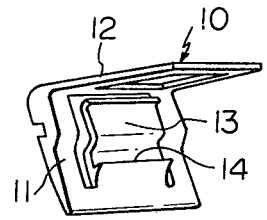
FIG. 3 is a perspective view of the clip illustrated in FIG. 2.
Figure 4:
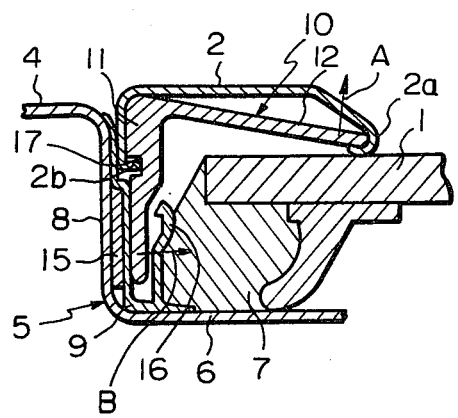
FIG. 4 is a cross-sectional side view taken along the line IV—IV in FIG. 2.
Figure 5:
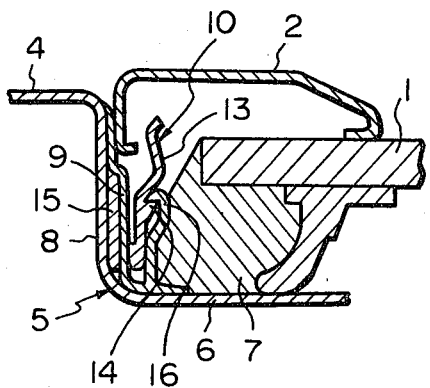
FIG. 5 is a cross-sectional side view taken along the line V—V in FIG. 2.
Figure 6:
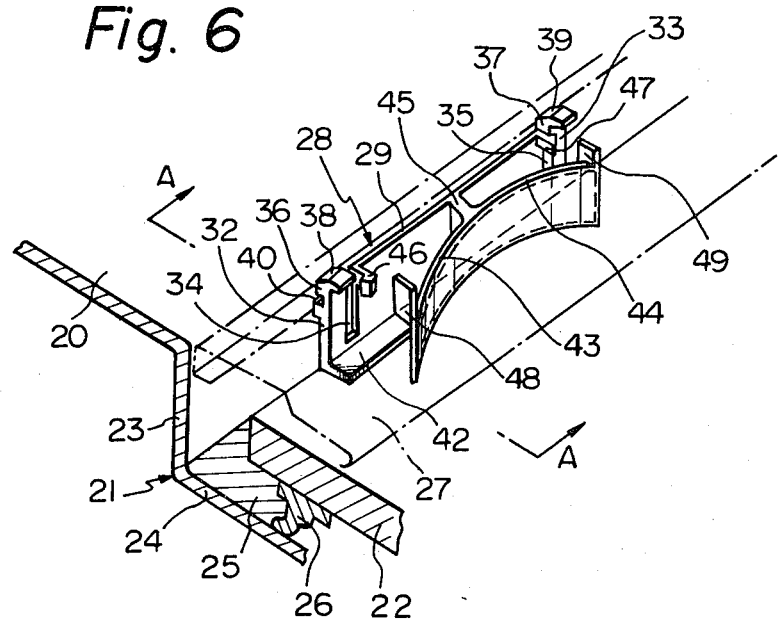
FIG. 6 is a perspective view of an embodiment of a window molding fixing device according to the present invention.

Referring to FIG. 6, 20 designates a body panel exposed to the exterior of a vehicle, and 21 a fillister having an L-shaped cross-section for receiving a windowpane 22 therein. The fillister 21 comprises a riser portion 23 extending inwardly from the edge of the body panel 20 and substantially perpendicular to the body panel 20, and a bottom wall portion 24 extending from the inner end of the riser portion 23 parallel to the body panel 20. The windowpane 22 is stuck onto the bottom wall portion 24 by means of an adhesive packing material 25 which has a resiliency when it is hardened. In addition, a dam member 26 is mounted on the rear face of the windowpane 22 for preventing the outflow of the adhesive packing material 25 when the windowpane 22 is stuck onto the bottom wall portion 24 by using the adhesive packing material 25. FIG. 6 illustrates the interior of a window molding 27 having a generally C-shaped cross-section and the window molding 27 is depicted by a line of short and long dashes.

Figure 7:
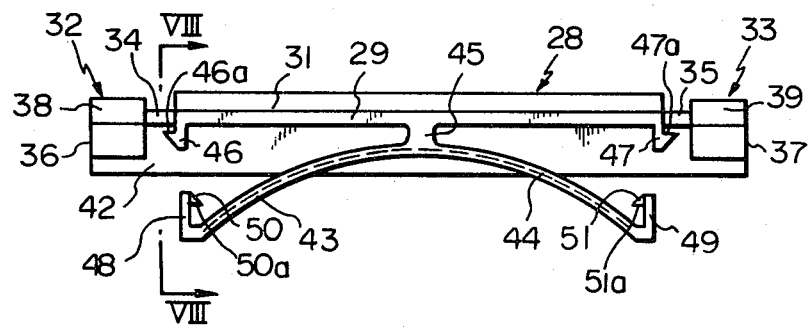
FIG. 7 is a plan view of the molding clip illustrated in FIG. 6.

FIG. 6 illustrates the state wherein the window molding 27 is fixed onto the windowpane 22 by means of a molding clip 28 according to the present invention, and FIGS. 7 and 8 illustrate only the molding clip 28 of FIG. 6. Referring to FIGS. 6 through 8, the molding clip 28 comprises a flat base portion 29 extending along the riser portion 23 of the fillister 21, and the base portion 29 is stuck onto the riser portion 23 of the fillister 21 by means of a two-face adhesive tape 31. Holding portions 32, 33 are formed in one piece on the opposite ends of the base portion 29, and transversely extending slots 34 and 35 are formed between the base portion 29 and the holding portion 32 and between the base portion 29 and the holding portion 33, respectively. The holding portions 32 and 33 have on their upper ends enlarged heads 36 and 37, respectively, and the enlarged heads 36 and 37 have slanted guide walls 38 and 39 which are downwardly slanted towards the riser portion 23 of the fillister 21, respectively. In addition, grooves 40 and 41, having a U-shaped cross-section, are formed on the rear faces of the holding portions 32 and 33 at a position slightly spaced from the slanted guide walls 38 and 39 beneath the slanted guide walls 38 and 39, respectively. Furthermore, a leg portion 42, extending along the bottom wall portion 24 of the fillister 21, is formed in one piece on the lower ends of the base portion 29 and the holding portions 32, 33.

As illustrated in FIGS. 6 through 8, a pair of elastic wings 43, 44 is arranged in front of the base portion 29 and spaced from the base portion 29, and the elastic wings 43, 44 are connected to the central portion of the base portion 29 via a bridge portion 45. When the elastic wings 43, 44 are in a free state, the elastic wings 43, 44 are curved so that the distance between the base portion 29 and the elastic wings 43, 44 is increased as the elastic wings 43, 44 approach the corresponding ends of the base portion 29 from the bridge portion 45, as illustrated in FIG. 7. The sum of the longitudinal length of the elastic wings 43, 44 is approximately equal to the entire length of the base portion 29. Latch claws 46, 47 are formed on the tops of the opposite ends of the base portion 29. The claws 46 and 47 project towards the elastic wings 43 and 44 and have engaging faces 46a and 47a extending parallel to the base portion 29, respectively. In addition, flat disengaging arms 48 and 49, extending towards the latch claws 46 and 47, are formed in one piece on the tips of the elastic wings 43 and 44, respectively. As illustrated in FIGS. 6 and 8, the lower ends of the disengaging arms 48 and 49 terminate at the halfway region of the elastic wings 43 and 44, respectively, and the upper ends of the disengaging arms 48 and 49 project upwardly from the tops of the elastic wings 43 and 44. As illustrated in FIG. 7, latch claws 50 and 51, which are engageable with the latch claws 46 and 47 of the base portion 29, are formed on the inner walls of the disengaging arms 48 and 49 and have flat engaging faces 50a and 51a, respectively. In FIG. 8, the latch claw 50 and the flat engaging face 6a are depicted by the broken line.

Figure 11:
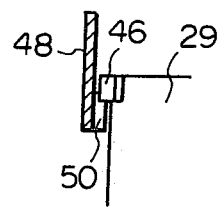
FIG. 11 is a cross-sectional view taken along the line XI—XI in FIG. 9.
Figure 12:
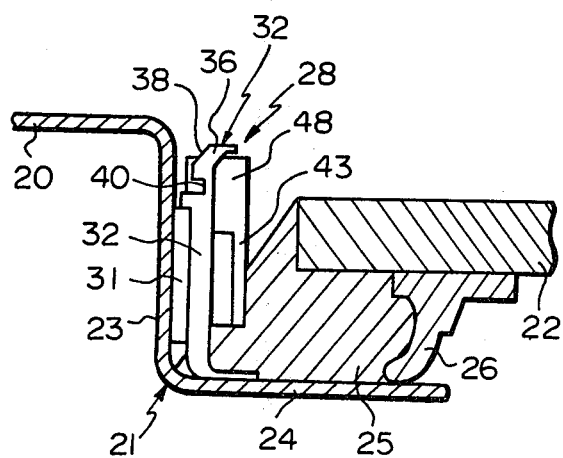
FIG. 12 is a cross-sectional side view taken along the line A—A in FIG. 6, illustrating the molding clip before the window molding is fixed onto the windowpane.

If the disengaging arms 48, 49 of the elastic wings 43, 44 are pushed towards the corresponding latch claws 46, 47 against the elastic force of the elastic wings 43, 44, the latch claws 50, 51 of the disengaging arms 48, 49 are engaged with the corresponding latch claws 46, 47 of the base portion 29. FIGS. 9 through 11 illustrate the molding clip 28 which is in such an engaging state. From FIG. 9, it will be understood that, when the molding clip 28 is in such an engaging state, since the elastic wings 43, 44 approach to the front face of the base portion 29, the transverse width of the molding clip 28 becomes rather thin. In addition, from FIGS. 10 and 11, it will be also understood that the latch claw 50 of the elastic wing 43 is in partial engagement with the latch claw 46 of the base portion 29 at the lower end portion of the latch claw 46 and at the upper end portion of the latch claw 50. Consequently, from FIGS. 10 and 11, it will be understood that, if the disengaging arm 48 is slightly pushed downward, the latch claw 50 of the elastic wing 43 is disengaged from the latch claw 46 of the base portion 29.

Figure 13:
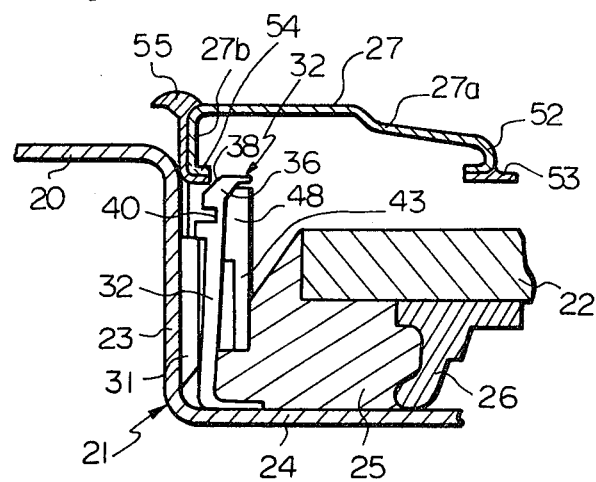
FIG. 13 is a cross-sectional side view taken along the line A—A in FIG. 6, illustrating the initial stage of the insertion of the window molding.

As illustrated in FIG. 13, the window molding 27 comprises a front portion 27a extending substantially parallel to the windowpane 22 and exposed to the exterior of the vehicle, and a bending portion 27b extending downwardly from the outer circumferential edge of the front portion 27a and substantially perpendicular to the front portion 27a. The inner circumferential edge 52 of the front portion 27a of the window molding 27 is bent inward in the form of a C-shaped cross-section and a rubber member 53 for protection is stuck onto the outer wall of the inner circumferential edge 52 of the front portion 27a. On the other hand, the lower edge portion 54 of the bending portion 27a of the window molding 27 is bent in the form of an L-shaped cross-section, and a rubber member 53 for protection is stuck onto the outer wall of the bending portion 27b.

Figure 14:
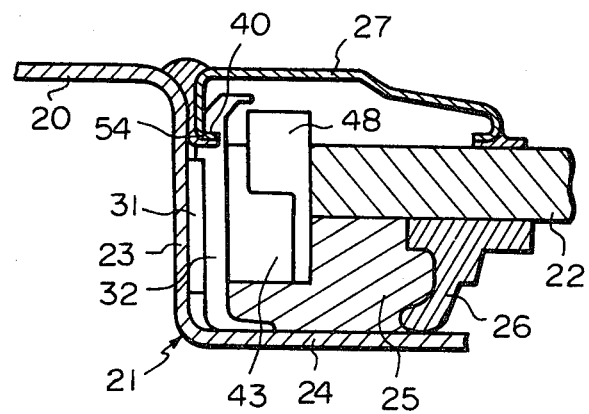
FIG. 14 is a cross-sectional side view taken along the line A—A in FIG. 6, illustrating the window molding the insertion of which is completed.

In the case wherein the molding clip 28 is attached to the riser portion 23 of the fillister 21, firstly, the latch claws 50, 51 of the elastic wings 43, 44 are engaged with the corresponding latch claws 46, 47 of the base portion 29 as illustrated in FIG. 9 and, then, the molding clip 28 is stuck onto the riser portion 23 of the fillister 21 by means of the two-face adhesive tape 31. After this, the windowpane 22 is stuck onto the bottom wall portion 24 of the fillister 21 by means of the adhesive packing material 25. Then, as illustrated in FIG. 13, the lower edge portion 54 of the bending portion 27b of the window molding 27 is inserted between the riser portion 23 of the fillister 21 and the holding portions 32, 33. At this time, the lower edge portion 54 of the bending portion 27b of the window molding 27 abuts against the slanted guide walls 38, 39 formed on the enlarged heads 36, 37 of the holding portions 32, 33 and then is inserted between the riser portion 23 and the holding portions 32, 33 while elastically deforming the holding portions 32, 33 towards the windowpane 22. Then, the lower edge portion 54 of the bending portion 27b of the window molding 27 come into the engagement with the top faces of the disengaging arms 48, 49. When the lower edge portion 54 of the bending portion 27b of the molding clip 28 is further pushed downward, the latch claws 50, 51, formed on the disengaging arms 48, 49, move downward relative to the latch claws 46, 47 formed on the base portion 29 and, thus, the latch claws 50, 51 of the disengaging arms 48, 49 are disengaged from the latch claws 46, 47 of the base portion 29. At this time, the elastic wings 43, 44 are returned to a state as illustrated in FIG. 7 due to the elastic force of the elastic wings 43, 44. As a result of this, as illustrated in FIGS. 6 and 14, the elastic wings 43, 44 enter into the adhesive packing material 25 which has not been hardened, and the outer ends of the elastic wings 43, 44 resiliently abut against the circumferential end face of the windowpane 22. Since the outer ends of the elastic wings 43, 44 resiliently abut against the circumferential end face of the windowpane 22, as mentioned above, the base portion 29 is pressed towards the riser portion 23 of the fillister 21 due to the elastic force of the elastic wings 43, 44 and, thus, there is no danger that the base portion 29 will become detached from the riser portion 23 of the fillister 21. When the lower edge portion 54 of the bending portion 27b of the molding clip 27 is further pushed downward, the lower edge portion 54 of the bending portion 27b of the molding clip 27 is fitted into the grooves 40, 41 formed on the rear faces of the holding portions 32, 33 as illustrated in FIG. 14 and, as a result, the window molding 27 is fixed onto the windowpane 22.

Figure 19:
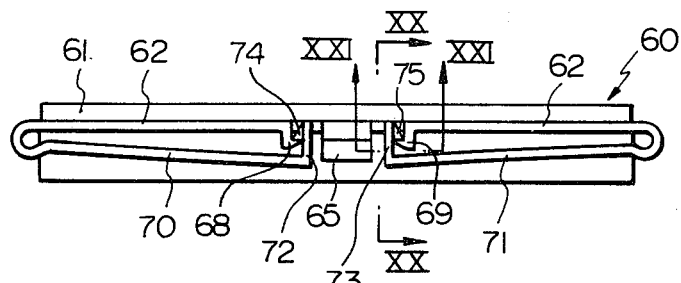
FIG. 19 is a plan view of a molding clip in which the elastic wings are engaged with the latch claws of the base portion.
Figure 20:
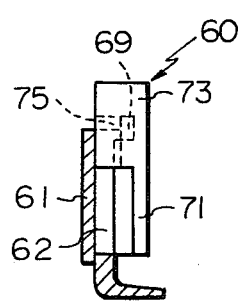
FIG. 20 is a cross-sectional view taken along the line XX—XX in FIG. 19.
Figure 21:
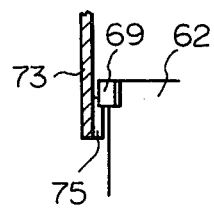
FIG. 21 is a cross-sectional view taken along the line XXI—XXI in FIG. 19.
Figure 22:
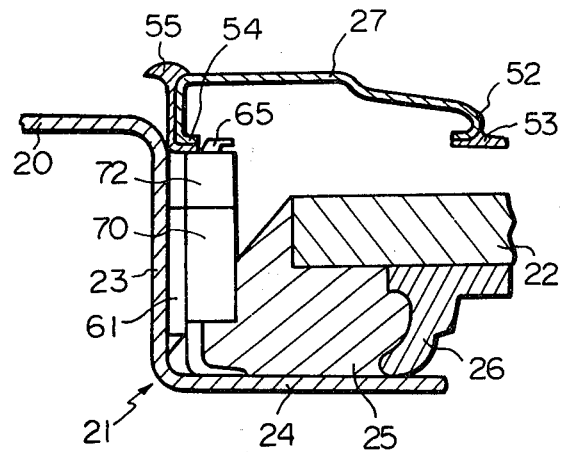
FIG. 22 is a cross-sectional side view taken along the line B—B in FIG. 15, illustrating the initial stage of the insertion of the window molding.

FIGS. 15 through 23 illustrate an alternative embodiment. In FIGS. 15 through 23, similar components are indicated with the same reference numerals used in FIGS. 6 through 14. Referring to FIGS. 15 through 18, a molding clip 60 is provided, which comprises a base portion 62 stuck onto the riser portion 23 of the fillister 21 by means of a two-face adhesive tape 61. A pair of transversely extending slots 63, 64 is formed on the central portion of the base portion 62, and a holding portion 65 is formed between the slots 63 and 64. The holding portion 65 has a slanted guide wall 66 at the rear face of the head thereof and also has a groove 67, having a U-shaped cross-section, at a position beneath the slanted guide wall 66. A pair of latch claws 68, 69 is formed on the upper ends of the central portion of the base portion 62 at a position adjacent to the slots 63, 64. In addition, elastic wings 70, 71, extending inwardly, while curving from the opposite ends of the base portion 62 towards the circumferential end face of the windowpane 22, are formed in one piece on the opposite ends of the base portion 62. Flat disengaging arms 72 and 73, extending towards the latch claws 68 and 69 and projecting upwardly from tops of the elastic wings 70 and 71, are formed in one piece on the tips of the elastic wings 70 and 71, respectively. Latch claws 74 and 75, which are engageable with the latch claws 68 and 69 formed on the base portion 62, are formed in one piece on the inner walls of the disengaging arms 72 and 73, respectively. The latch claws 74, 75 of the disengaging arms 72, 73 are engaged with the latch claws 68, 69 of the base portion 62 by pushing the disengaging arms 72, 73 of the elastic wings 70, 71 towards the corresponding latch claws 68, 69 of the base portion 62 against the elastic force of the elastic wings 70, 71. FIGS. 19 through 21 illustrate the molding clip 60 which is in such an engaging state.

In this embodiment, as in the same manner as described with reference to FIGS. 6 through 14, firstly, the latch claws 74, 75 of the elastic wings 70, 71 are engaged with the latch claws 68, 69 of the base portion 62 as illustrated in FIGS. 19 through 21 and, then, the molding clip 60 is stuck onto the riser portion 23 of the fillister 21 by means of the two-face adhesive tape 61.

Figure 15:
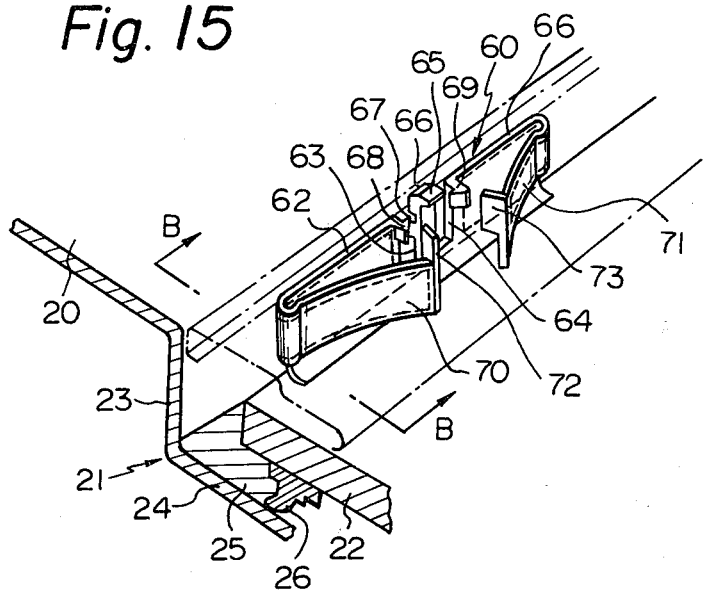
FIG. 15 is a perspective view of an alternative embodiment according to the present invention.
Figure 16:
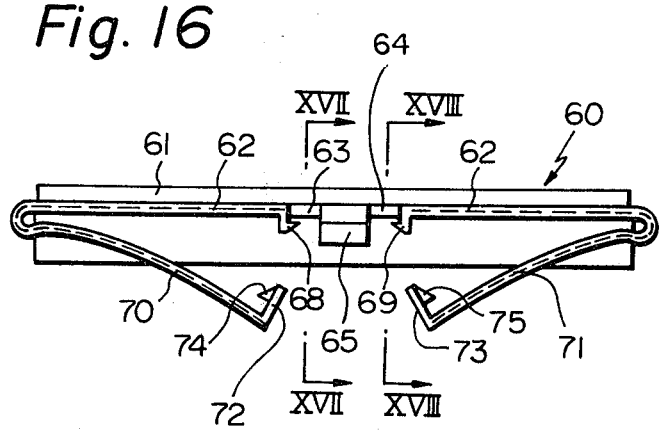
FIG. 16 is a plan view of the molding clip illustrated in FIG. 15.
Figure 17:
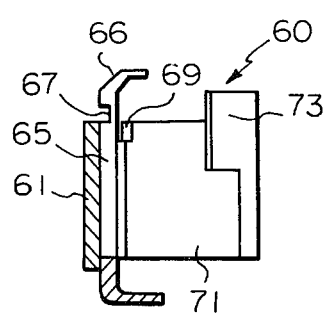
FIG. 17 is a cross-sectional side view taken along the line XVII—XVII in FIG. 16.
Figure 18:
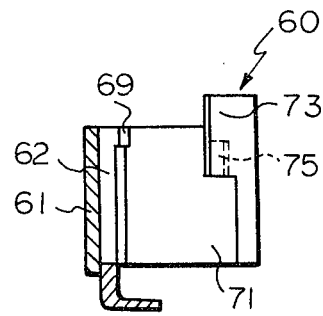
FIG. 18 is a cross-sectional side view taken along the line XVIII—XVIII in FIG. 16.
Figure 23:
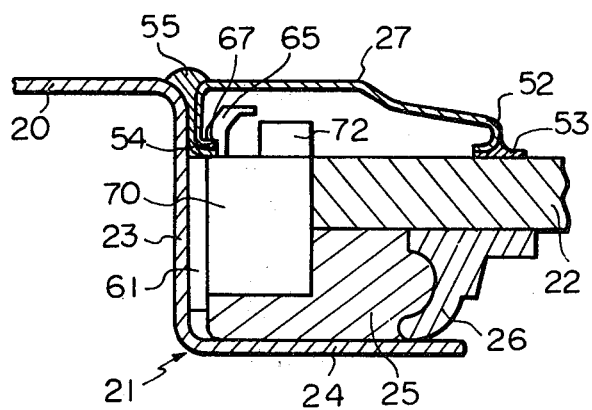
FIG. 23 is a cross-sectional side view taken along the line B—B in FIG. 15, illustrating the window molding the insertion of which is completed.

Then, the windowpane 22 is stuck onto the bottom wall portion 24 of the fillister 21 by means of the adhesive packing material 25. Then, the lower edge portion 54 of the bending portion 27a of the window molding 27 is inserted between the riser portion 23 of the fillister 21 and the holding portion 65 and abuts against the top faces of the disengaging arms 72, 73. After this, when the lower edge portion 54 of the bending portion 27a of the window molding 27 is further pushed downward, since the latch claws 74, 75 of the disengaging arms 72, 73 move downward relative to the latch claws 68, 69 of the base portion 62, the latch claws 74, 75 of the disengaging arms 72, 73 are disengaged from the latch claws 68, 69 of the base portion 62 and, as a result, the end faces of the elastic wings 70, 71 resiliently abut against the circumferential end face of the windowpane 22 as illustrated in FIGS. 15 and 23. After this, when the lower edge portion 54 of the bending portion 27b of the window molding 27 is further pushed downward, the lower edge portion 54 of the bending portion 27a of the window molding 27 is fitted into the groove 67 formed on the rear face of the holding portion 65.

In the embodiments illustrated in FIGS. 6 through 14 and in FIGS. 15 through 23, the molding clips 28 and 60 are made, in one piece, of a synthetic resin, such as polyamide or polyacetal. In addition, in order to obtain a further higher elasticitiy, a metallic spring plate may be embedded in the elastic wings 43, 44, 70, 71 as illustrated by broken lines in FIGS. 6, 7, 15 and 16. Furthermore, the entirety of the molding clips 28, 60 may be made, in one piece, of a metallic material.

According to the present invention, the window molding fixing device can be constructed by a single part, and there is no danger that the molding clip, used for holding the window molding, will become detached from the riser portion of the fillister. In addition, when the latch claws of the elastic wings are engaged with the latch claws of the base portion, the transverse width of the molding clip becomes rather thin. Consequently, since there is no possibility the molding clip will disturb the sticking operation of the windowpane, the sticking operation of the windowpane can be easily carried out.

While the invention has been described by reference to specific embodiments chosen for purposes of illustration, it should be apparent that numerous modifications could be made thereto by those skilled in the art without departing from the basic concept and scope of the invention.

I claim:

1. A method of fixing a window molding onto a windowpane arranged in an L-shaped cross-sectional fillister of a vehicle body, which extends along an outer periphery of the windowpane and comprises a riser portion extending inwardly from the vehicle body, and a bottom portion extending substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section and an outer periphery, said method comprising using a molding clip which comprises a holding portion engageable with the outer periphery of the window molding, an elastic wing member intended to resiliently abut against the outer periphery of the windowpane within the gap, and a claw member engageable with said elastic wing member for maintaining said elastic wing member in a compressed state to accumulate the elastic force of said elastic wing member, said method being carried out by the following steps of:

engaging said elastic wing member with said claw member to maintain said elastic wing member in the composed state;

sticking said molding clip onto the riser portion of said fillister;

pushing said window molding to insert the outer periphery of said window molding between said holding portion and the riser portion of said fillister;

automatically disengaging said elastic wing member from said claw member due to the pushing operation and causing said elastic wing member to resiliently abut against the outer periphery of said windowpane, and;

engaging the outer periphery of said window molding with said holding portion to hold said window molding.

2. A method as claimed in claim 1, wherein, when the window molding is inserted between said holding portion and the riser portion of said fillister, the outer periphery of said window molding automatically comes into engagement with a groove of said holding portion.

3. A method as claimed in claim 1, wherein, after said elastic wing member is disengaged from said claw member, said elastic wing member abuts against a circumferential end face formed on the outer periphery of said windowpane.

4. A method as claimed in claim 1, wherein said elastic wing member resiliently abuts against the outer periphery of said windowpane due to the elastic force of said elastic wing member.

5. A method as claimed in claim 4, wherein, after said elastic wing member is disengaged from said claw member, said elastic wing member moves towards the outer periphery of said windowpane on each side of a center of said molding clip.

6. A method as claimed in claim 1, wherein, after said elastic wing member is disengaged from said claw member, said elastic wing member abuts against the outer periphery of said windowpane at two points on the outer periphery of said windowpane.

7. A method as claimed in claim 1, wherein said claw member mechanically engages said elastic wing member.

8. A method as claimed in claim 7, wherein, when said molding clip is inserted between said holding portion and said riser portion, a portion of said molding clip is deformed, and said elastic wing member becomes disengaged from said claw member due to the deformation of the portion of said molding clip.

9. A method as claimed in claim 8, wherein, when said molding clip is inserted between said holding portion and said riser portion, and said elastic wing member is deformed.

10. A method as claimed in claim 1, wherein said elastic wing member is disengaged from said claw member immediately before the insertion of said window molding is completed.

11. A windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section and an outer periphery, said device having a molding clip fixed onto the riser portion of said fillister and inserted into the gap for fixing the window molding onto the windowpane, said molding clip comprising:

a holding portion engageable with the outer periphery of said window molding to hold said window molding;

an elastic wing member intended to resiliently abut against the outer periphery of the windowpane within the gap;

latch means engageable with said elastic wing member for maintaining said elastic wing member in a compressed state to accumulate the elastic force of said elastic wing member, and;

disengaging means for disengaging said elastic wing member from said latch means and causing said elastic wing member to resiliently abut against the outer periphery of said windowpane, said disengaging means comprising the outer periphery of said window molding, which is engageable with said elastic wing member.

12. A windowpane assembly as claimed in claim 11, wherein said holding portion has a groove which is engageable with the outer periphery of said window molding.

13. A windowpane assembly as claimed in claim 11, wherein said molding clip is stuck onto the riser portion of said fillister.

14. A windowpane assembly as claimed in claim 11, wherein said elastic wing member has at least one end portion which is able to resiliently abut against a circumferential end face formed on the outer periphery of said windowpane.

15. A windowpane assembly as claimed in claim 11, wherein said elastic wing member is made of an elastic material.

16. A windowpane assembly as claimed in claim 15, wherein said elastic wing member comprises a pair of elastic wings extending in an opposite direction relative to the center of said molding clip.

17. A windowpane assembly as claimed in claim 16, wherein each of said elastic wings has an outer end which is engageable with the outer periphery of said windowpane.

18. A windowpane assembly as claimed in claim 15, wherein said elastic wing member comprises a pair of elastic wings extending inwardly from opposite ends of said molding clip towards a center of said molding clip.

19. A windowpane assembly as claimed in claim 18, wherein each of said elastic wings has an outer end which is engageable with the outer periphery of said windowpane.

20. A windowpane assembly as claimed in claim 11, wherein said latch means comprises at least one claw which is engageable with said elastic wing member.

21. A windowpane assembly as claimed in claim 20, wherein the claw of said latch means is formed on a base portion of said molding clip.

22. A windowpane assembly as claimed in claim 11, wherein said elastic wing member has on its top a disengaging arm which is engageable with the outer periphery of said window molding.

23. A windowpane assembly as claimed in claim 11, wherein said molding clip is formed in one piece.

24. A windowpane assembly as claimed in claim 23, wherein said molding clip is made of a synthetic resin.

25. A windowpane assembly as claimed in claim 24, wherein a metallic spring plate is embedded in said elastic wing member.

26. A windowpane assembly as claimed in claim 23, wherein said molding clip is made of a metallic material.

* * * * *